(12) United States Patent
Nougaret et al.

(10) Patent No.: US 6,476,378 B2
(45) Date of Patent: Nov. 5, 2002

(54) IMAGING APPARATUS AND METHOD OF SAME

(75) Inventors: Jean-Luc Nougaret, Tokyo; Hiroyuki Segawa, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 18 days.

(21) Appl. No.: 09/734,252

(22) Filed: Dec. 11, 2000

(65) Prior Publication Data

US 2002/0020807 A1 Feb. 21, 2002

(30) Foreign Application Priority Data

Dec. 27, 1999 (JP) .......................................... 11-369097

(51) Int. Cl.[7] ................................................. G06T 3/00
(52) U.S. Cl. .............................. 250/227.11; 250/227.2; 250/227.31; 385/116; 385/120; 345/173; 345/174; 345/175; 345/177; 345/181
(58) Field of Search ............................. 250/208.1, 216, 250/227.11, 227.2, 227.31; 385/116, 120; 345/173, 174, 175, 176, 177, 181

(56) References Cited

U.S. PATENT DOCUMENTS

| | | | | |
|---|---|---|---|---|
| 4,492,424 A | * | 1/1985 | Clegg .......................... | 126/708 |
| 4,865,417 A | * | 9/1989 | Naohiro et al. ............. | 385/123 |
| 5,293,437 A | * | 3/1994 | Nixon .......................... | 385/115 |
| 5,600,751 A | * | 2/1997 | Peli .............................. | 385/116 |
| 5,684,905 A | * | 11/1997 | Sugawara et al. .......... | 385/120 |
| 5,684,906 A | * | 11/1997 | Sugawara .................... | 385/120 |
| 5,832,168 A | * | 11/1998 | Yenter ......................... | 385/147 |
| 6,031,954 A | * | 2/2000 | Higuchi ....................... | 385/120 |
| 6,040,825 A | * | 3/2000 | Yamamoto et al. ......... | 345/173 |
| 6,052,117 A | * | 4/2000 | Ohara et al. ................. | 345/173 |
| 6,219,483 B1 | * | 4/2001 | Sugawara et al. .......... | 385/120 |
| 6,313,583 B1 | * | 11/2001 | Lamontagne et al. ...... | 345/762 |
| 6,326,939 B1 | * | 12/2001 | Smith .......................... | 345/84 |

* cited by examiner

*Primary Examiner*—Robert H. Kim
*Assistant Examiner*—Allen C Ho
(74) *Attorney, Agent, or Firm*—Bell, Boyd & Lloyd LLC

(57) ABSTRACT

An imaging apparatus optically extruding parts of a screen image and outputting the extruded images from surfaces different in dimension from the screen surface, wherein a set of image guides formed by bundles of optical fibers placed on the surface of the screen extrude portions of the image displayed on the screen and radiate the extruded images from opposite surfaces different in dimension from the surface of the screen. When some image or a video stream are displayed on the screen, image features are modified so that the extruded portions are displayed on the surfaces of the image guides properly in response to the positions and orientations of the image guides. When the imaging apparatus is equipped to track the positions and orientations of the image guides in real-time, a user can interact with an image animation by moving the image guides.

2 Claims, 6 Drawing Sheets

IMAGING APPARATUS AND METHOD OF SAME

BACKGROUND OF THE INVENTION

1. Field of the Invention

The present invention relates to an imaging apparatus for "optically extruding" portions of an image displayed on a screen and displaying the "extruded" images on the surface of image guides placed on the screen and able to be moved freely over it.

2. Description of the Related Art

Optical image guides such as coherent bundles of optical fibers, fibrous crystals, or glass mosaics are known. Such optical materials and devices optically carry images between faces cut across the array fibers or mosaics and give view angles exceeding what can be achieved through the sole means of lenses, prisms, or mirrors.

The distinctive feature of fiber bundles and mosaics is that an image entering an extremity of the fiber bundle etc. appears to radiate from the other extremity as if it originated there.

Fiber bundles are practically used as image carriers for such specific applications as medical and industrial inspection, sometimes relying on an electronic camera as an image amplifier. Glass mosaics are also used as TV screen flatteners.

Although the initial impetus for the development of fiber optics technology originated from the idea of carrying images optically, the fields of application of such fiber bundles and glass mosaics have remained rather confined.

SUMMARY OF THE INVENTION

An object of the present invention is to provide an imaging apparatus for "optically extruding" a portion of an image displayed on a screen and displaying it on the surface of an image guides of a shape or size resulting from a combinations of a fiber bundle together with a supporting screen. Preferably, in the present invention, the screen has a flat surface.

In the terminology of the present invention, "optical extrusion" refers to a process through which a part of an image displayed on the screen is transported optically and displayed on a display surface different in dimension from the screen surface thereby physically adding a third dimension to the screen's planar image.

Another object of the present invention is to provide an imaging apparatus for generating an image on a screen in such a way that an extruded part of the screen image appears correctly on the image guide whatever the location or motion of the image guide over the screen.

To achieve the above objects, according to a first aspect of the present invention, there is provided an imaging apparatus for optically extruding a portion of a screen image and displaying the extruded image on a surface different in dimension from that of the screen, which comprises a display device having a screen on which an image is displayed and an optical device placed on the surface of the screen, receiving a portion of the image displayed on the surface of the screen at one end, and outputting the received image to another end which is different in dimension from the surface of the screen.

According to a second aspect of the present invention, there is provided an imaging apparatus comprising a display device having a screen on which an image is displayed and an optical device placed on the surface of the screen, receiving a portion of the image displayed on the surface of the screen at one end, converting the received image, and outputting the converted image to another end which is different in dimension from the surface of the screen.

According to a third aspect of the present invention, there is provided an imaging apparatus comprises a display device having a screen on which an image is displayed, an optical device placed on the surface of the screen, receiving a portion of the image displayed on the surface of the screen at one end, and outputting the received image to another end which is different in dimension from the surface of the screen, and an image synthesis processor for generating an image of a predetermined character to be displayed on the screen and adding the image of the character to the image of a background in a predetermined position with a predetermined orientation.

According to a fourth aspect of the present invention, there is provided an imaging apparatus comprises a display device having a screen on which an image is displayed, an optical device placed on the surface of the screen, receiving a portion of the image displayed on the surface of the screen at one end, and outputting the received image to another end which is different in dimension from the surface of the screen, a sensor for acquiring a position and orientation of the optical device over the screen, and an image synthesis processor for generating an image of a character to be displayed on the screen and adding the image of the character to the image of a background in a predetermined position with a predetermined orientation in response to the position and orientation of the optical device acquired by the sensor.

According to a fifth aspect of the present invention, there is provided a method for optically extruding a portion of an image displayed on a screen and displaying the extruded image on a surface different in dimension from the surface of the screen by using an optical device placed on the surface of the screen, receiving a portion of the image displayed on the surface of the screen at one end, and outputting the received image to another end which is different in dimension from the screen surface, comprising a step of a sensing process for acquiring a position and orientation of the optical device over the screen, a step of an image synthesis process for generating an image of a character, adding the image of the character to an image of a background at a position and an orientation in response to the position and orientation of the optical device, and a step of a process for displaying the synthesized image on the screen.

In the present invention, preferably the optical device is made of a bundle of optical fibers, a fibrous crystal, or a glass mosaic. The surface of the other end of the optical device is formed to any shape, size, and orientation. Furthermore, preferably the screen has a flat surface.

BRIEF DESCRIPTION OF THE DRAWINGS

The above and further objects and novel features of the present invention will more fully appear from the following detailed description when the same is read in connection with the accompanying drawings. It is to be expressly understood, however, that the drawings are for the purpose of illustration only and is not intended as a definition of the limits of the invention. In the drawings.

DESCRIPTION OF THE PREFERRED EMBODIMENTS

Below, preferred embodiments will be described with reference to the accompanying drawings.

First Embodiment

Figure 1:
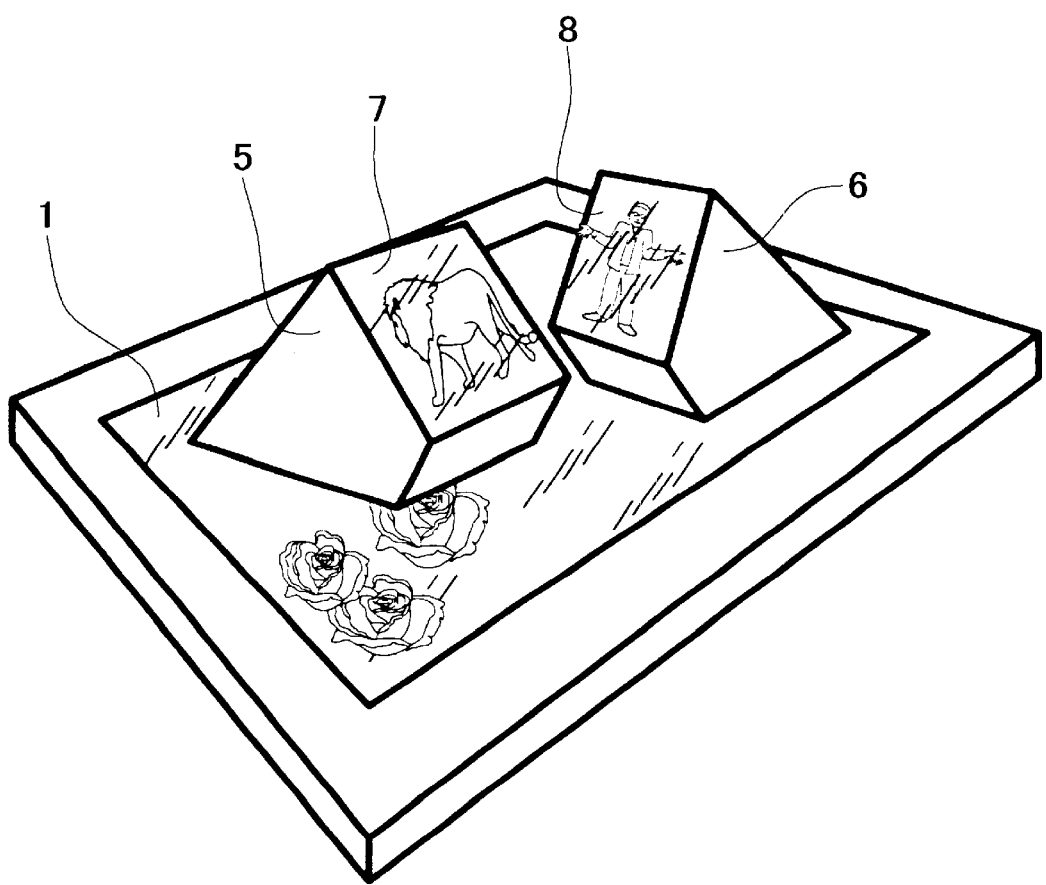
FIG. 1 is a view of an imaging apparatus of a first embodiment according to the present invention.

FIG. 1 is a view of a first embodiment of an imaging apparatus according to the present invention.

As illustrated in FIG. 1, the imaging apparatus of the present invention is constituted by a screen 1 for displaying an image and at least one image guide (hereinafter simply referred to as a "piece" for convenience) for optically extruding a portion of the image displayed on the screen and displaying the extruded image on a surface of any shape, location, orientation, and size different in dimension from that of the surface of the screen. In FIG. 1, for example, two pieces 5 and 6 are shown.

The screen 1 displays the image of some predetermined objects and characters (hereinafter simply referred to as characters) and a background. The screen 1 also supports the image extruding pieces 5 and 6 placed on its surface. Here, for example, a flat screen is preferable. But in the present invention, the screen 1 is not limited to one having a flat surface. Any screen that emits light in accordance with the image to be displayed, like a cathode-ray tube (CRT) or a liquid crystal display (LCD) with background light, is suitable.

Figure 2:
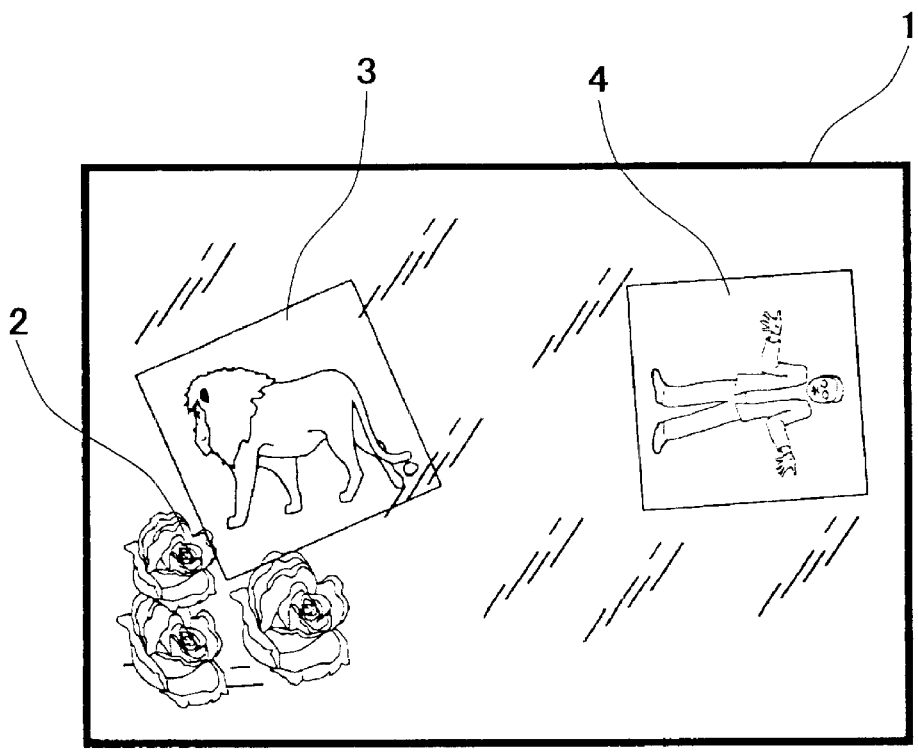
FIG. 2 is a view of a screen with images displayed on it.

FIG. 2 shows an example of the image displayed on the screen 1. As illustrated, the image of two characters 3 and 4 over a background 2 of for example an image of flowers is displayed by the screen 1. Here, the characters 3 and 4 can be static pictures or animated ones.

Figure 3:
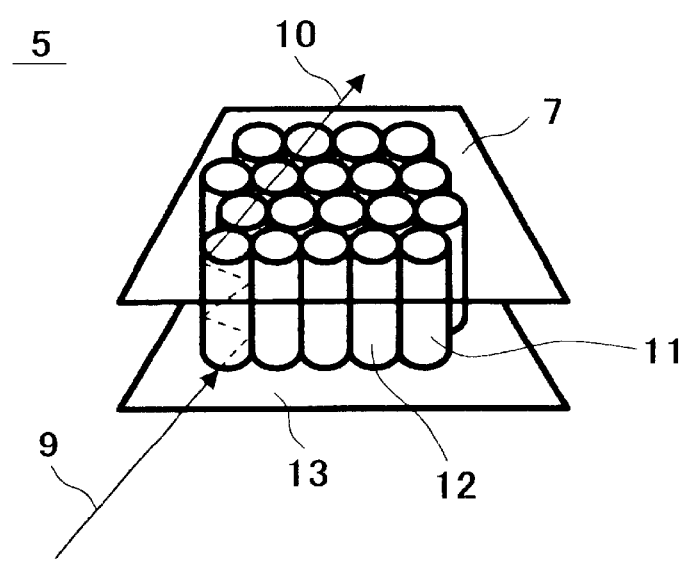
FIG. 3 is a view of an example of an image guide (referred to as a piece) formed by an optical fiber bundle.

FIG. 3 is a view of an example of the piece 5. As illustrated in FIG. 3, the piece 5 for extruding a portion of the image displayed on the screen is an image guide formed by, for example, a bundle of optical fibers 11 and 12. Each optical fiber 11 or 12 consists of a core and an external layer with a different optical index so that the light travelling through each fiber exits the surface with virtually no loss over the transport distance.

The piece 5 has a surface 13 touching the surface of the screen 1, and a surface 7 for displaying the extruded image. A light ray 9 emanating from the surface of the screen 1 and entering the surface 13 of the piece 5 with a particular incident angle with respect to the surface normal of the surface 13 is transported by one or plural optical fibers. The light ray traveling through the fibers leaves the other surface 7 of the piece as a light ray 10 with a similar exit angle with respect to the surface normal of the surface 7.

Figure 4:
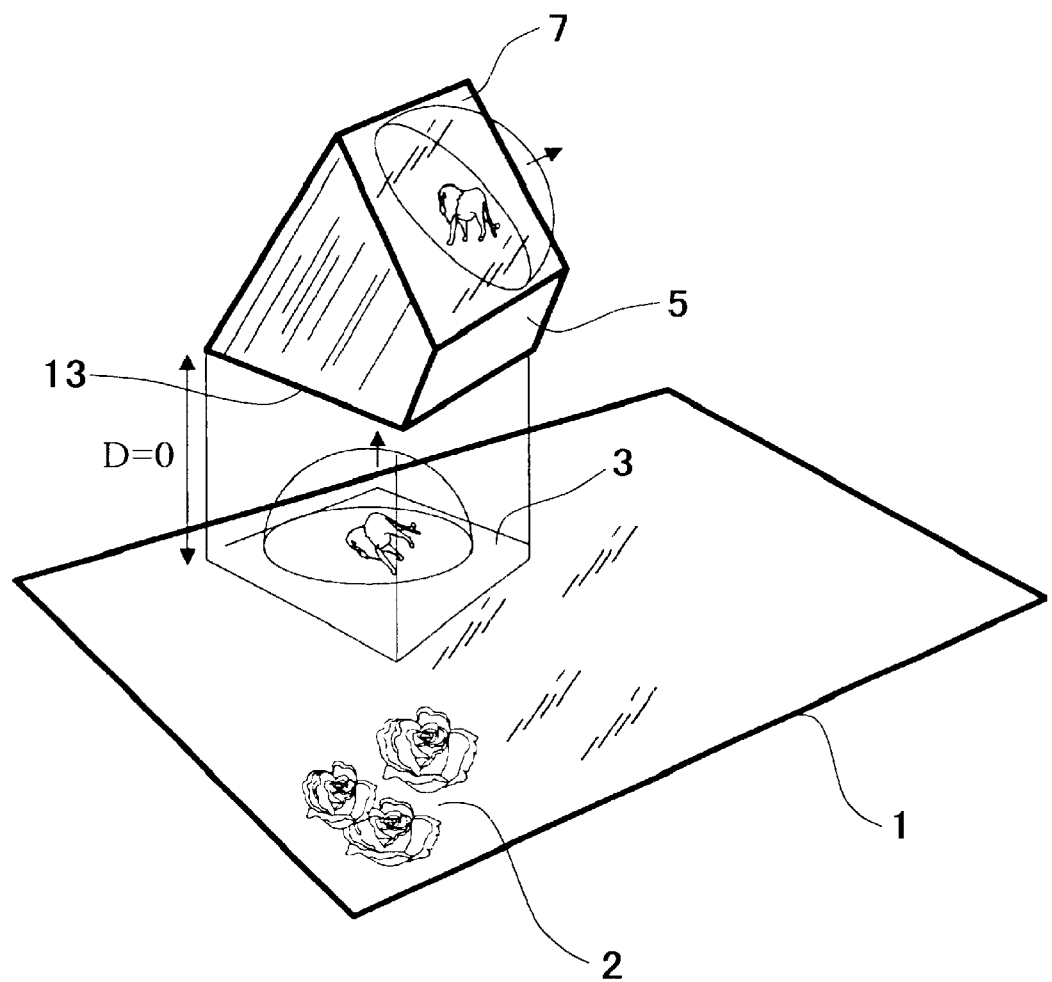
FIG. 4 is a view of the optical effects of the piece through which the image of a character on the screen is extruded so as to be displayed on the surface of the piece.

Because of this property, as shown in FIG. 4, the character displayed on the screen 1 is carried by the piece to its visible surface 7 where it radiates within a solid angle that can be ideally made close to a hemisphere, thereby enabling good viewing conditions from different perspectives.

In FIG. 4, the distance D is the distance between the surface 13 of the piece and the displaying surface of the screen 1. Here, D=0 means that the surface 13 of the piece 5 and the displaying surface of the screen 1 are actually in surface contact with each other.

Second Embodiment

Figure 5:
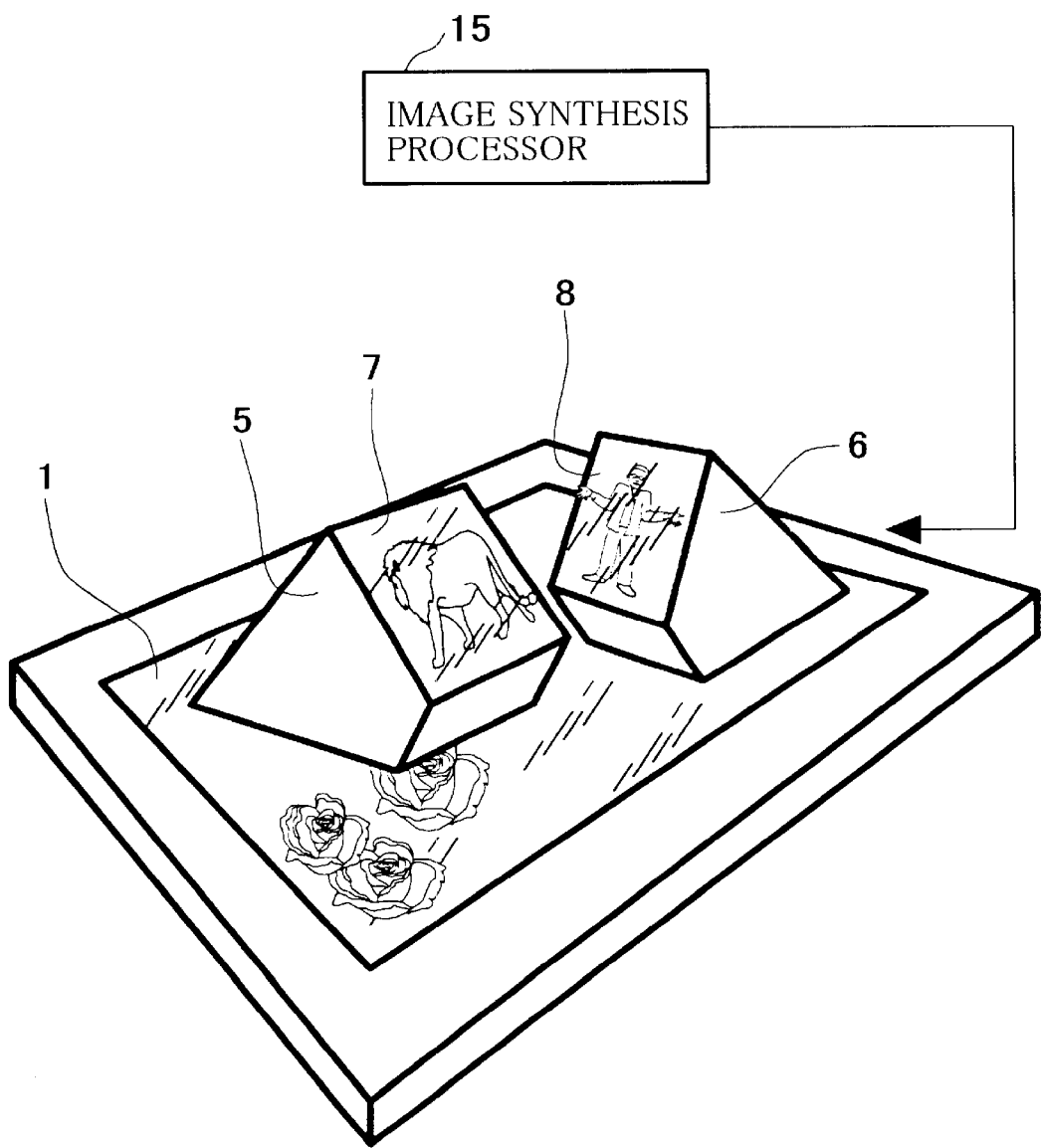
FIG. 5 is a view of an imaging apparatus of a second embodiment according to the present invention.

FIG. 5 is a view of a second embodiment of an imaging apparatus according to the present invention.

As illustrated in FIG. 5, the present embodiment of the imaging apparatus consists of a screen 1, two pieces 5 and 6, and an image synthesis processor 15. The screen 1 and the pieces 5 and 6 are substantially the same as those in the first embodiment shown in FIG. 1. That is, the screen 1 shows the image of characters and a background on its surface, while the pieces 5 and 6 optically extrude the images of characters show on the screen 1 and display the extruded images on their surfaces 7 and 8, respectively. The surfaces of the pieces 5 and 6 have any shapes, sizes, and orientations, as described above.

In the imaging apparatus of the present embodiment, the image synthesis processor 15 generates images of the characters and displays them on the screen 1. The image of the characters is, for example, a video stream.

As described above, according to the present embodiment, an image synthesis processor 15 for generating a video stream is provided. The video stream is displayed on the screen 1 at a predetermined position with a certain orientation. The pieces 5 and 6 optically extrude the images of the characters displayed on the screen 1 and display the extruded images on their surfaces 7 and 8. Accordingly, the images of animation of the characters displayed on the screen 1 are extruded by the pieces 5 and 6, and the extruded images are displayed on the surfaces 7 and 8 of the pieces 5 and 6.

Third Embodiment

Figure 6:
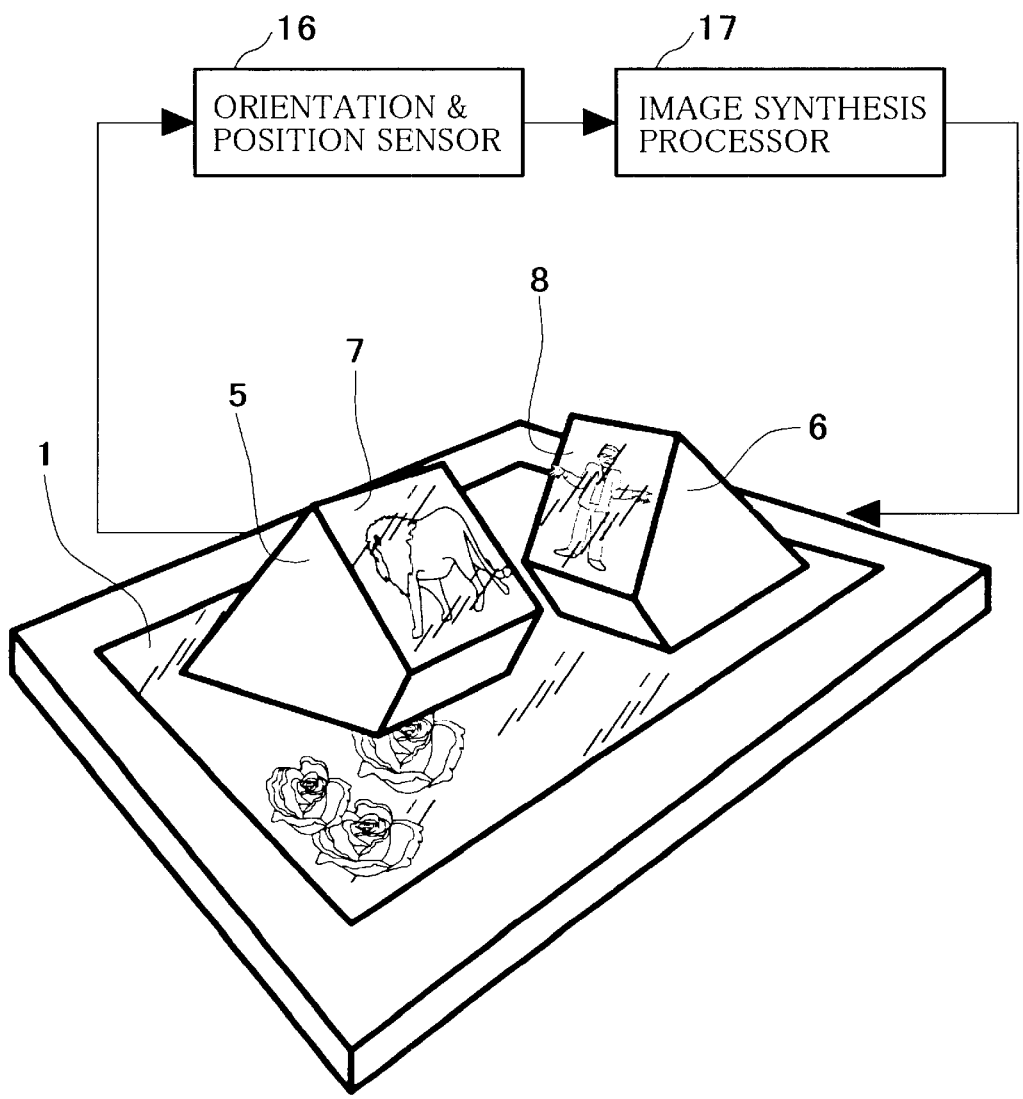
FIG. 6 is a view of an imaging apparatus of a third embodiment according to the present invention.
Figure 7:
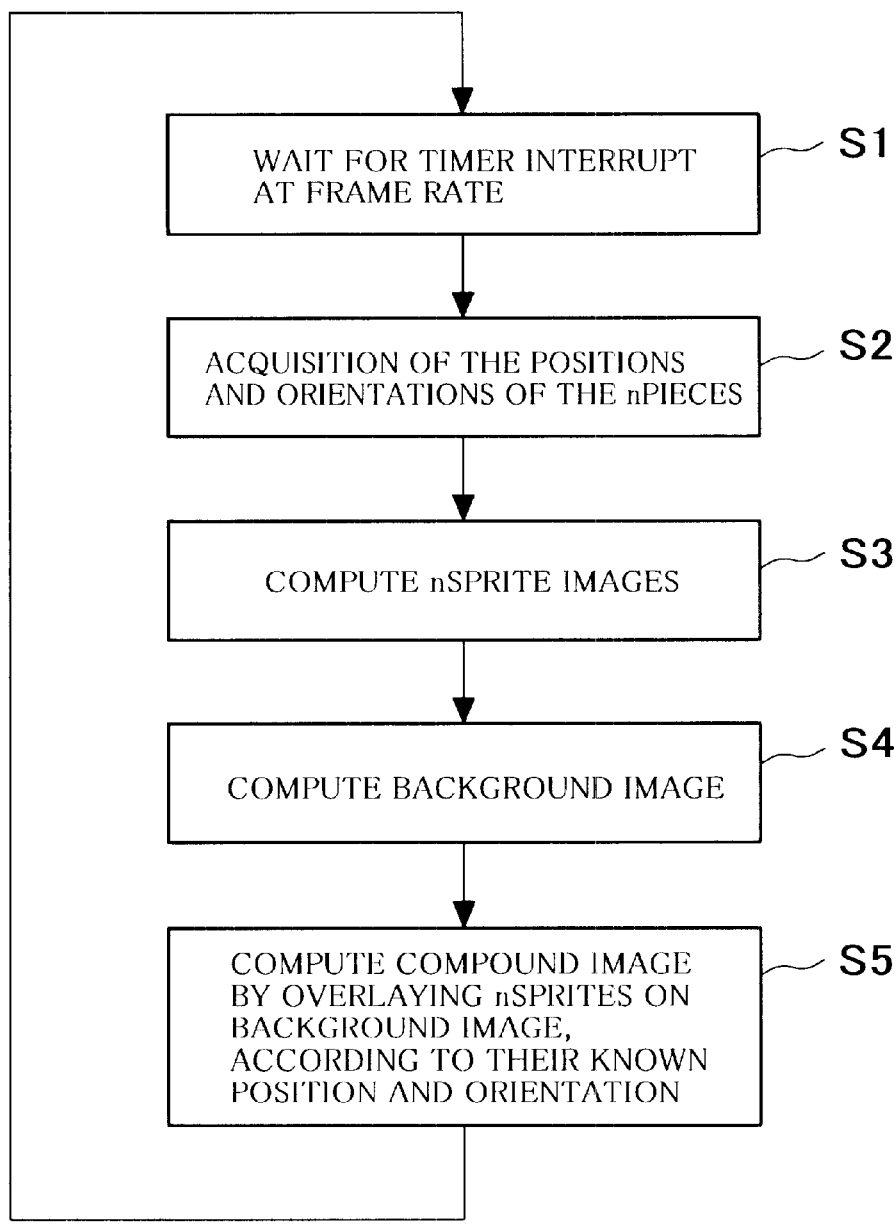
FIG. 7 is a flow chart of the process of the image synthesis of the third embodiment.

FIGS. 6 and 7 show a third embodiment of an imaging apparatus according to the present invention. FIG. 6 shows the constitution of the imaging apparatus of the present embodiment, and FIG. 7 is a flow chart showing the flow of signal processing in the imaging apparatus. As illustrated in FIG. 6, the imaging apparatus of the present embodiment is constituted by a screen 1, two pieces 5 and 6, an orientation and position sensor 16, and an image synthesis processor 17.

The imaging apparatus of the present embodiment is distinguished from the first and second embodiments by the fact that the orientation and position sensor 16 and the image synthesis processor 17 are provided for generating a video stream of the characters in response to the orientations and positions of the pieces 5 and 6. That is, the imaging apparatus of the present embodiment modifies the video stream according to the locations and motions of the pieces 5 and 6 over the screen 1. The orientation and position sensor 16 acquires information of the orientations and positions of the pieces 5 and 6 over the screen 1.

Note that the acquisition process of the information is not limited in the present embodiment. That is, the locations and orientations of the pieces 5 and 6 can be acquired by any available or conventional sensing technology including image and optical sensors as well as mechanical, ultrasonic, capacitance, magnetic, and magneto-resistive sensors.

The information of the locations and orientations of the pieces 5 and 6 over the screen 1 obtained by the orientation and position sensor 16 is sent to the image synthesis processor 17. The image synthesis processor 17 generates the video stream to be displayed by the screen 1 in response to the information of the locations and motions of the pieces 5 and 6.

FIG. 7 is a flow chart of the operation of the imaging apparatus of the present embodiment. As shown in FIG. 7, first, the orientation and position sensor 16 waits for a timer interrupt at a frame rate (step S1). Here, for example, the image of each character displayed on the screen 1 is modified at the timing of the frame display period of the screen 1. The orientation and position sensor 16 acquires the information of orientations and positions of the pieces, for example, n number of pieces as shown in FIG. 7 (step S2). The information of the orientations and positions of the n number of pieces is sent to the image synthesis processor 17. According to the information received from the orientation and position sensor 16, the image synthesis processor 17 computes the images of the n number of characters (step S3) and background (step S4). Then, the image synthesis processor 17 computes compound images by overlaying the image of the n number of characters on the background image according to the orientations and positions acquired by the orientation and position sensor 16.

As described above, the imaging apparatus of the present embodiment modifies the images of characters displayed on the screen 1 to be extruded and displayed on the surfaces of the pieces 5 and 6. Modification of the image refers to the process of modifying, in part or in whole, the image displayed on the screen 1 in response to the changes in the pieces' respective locations and orientations on the screen. When using the imaging apparatus of the present embodiment, the user changes the orientations and positions of any pieces 5 or 6, and the images of characters are modified in such a way that the image of each character always appear to radiate from the corresponding pieces.

There are many modifications of the process of image synthesis operations. For example, the image synthesis processor 17 can modify the characters' features, for example, the movements, the shapes, and sizes, etc. in response to the motions of the pieces over the screen 1. Furthermore, the image synthesis processor 17 can update the background image 2 in response to the way the pieces are moved over the screen 1.

As set forth above, the present invention has the advantages as follows:

First, the imaging apparatus of the present invention consists of a screen, a set of image guides referred to as pieces, and an image synthesis processor. Due to these elements, the computer-generated video streams and synthesized images of the characters displayed on the screen can be extruded in whole or in part so as to be displayed and manipulated in three physical dimensions. Each character may contain a computer-generated icon or an object that appear to stand vertically above the image plane and that may be animated in the vertical dimension. This physically brings a complementary third dimension to a planar screen. As discussed above, coupling an orientation and position sensor with the image synthesis processor makes it possible to control the animation of synthetic objects, characters, and backgrounds of a virtual, computer-generated scene so as to reflect changes in the locations and orientations of the pieces over the screen. This provides people with the capability to interact more directly with real-time computed generated scenes—mixing together control input and display devices in a fashion exceeding the level of interaction currently possible with video games. The present invention therefore provides a system suitable for playing interactive board games involving computer graphics or for carrying out experiments on virtual workbenches and entertainment playgrounds.

What is claimed is:

1. An imaging apparatus comprising:
    a display device having a screen on which an image is displayed,
    an optical device placed on the surface of the screen, receiving a portion of the image displayed on the surface of the screen at one end, and outputting the received image to another end which is different in dimension from the surface of the screen,
    a sensor for acquiring a position and orientation of the optical device over the screen, and
    an image synthesis processor for generating an image of a character to be displayed on the screen and adding the image of the character to the image of a background in a predetermined position and with a predetermined orientation in response to the position and orientation of the optical device acquired by the sensor.

2. A method for optically extruding a portion of an image displayed on a screen and displaying the extruded image on a surface different in dimension from the surface of the screen by using an optical device placed on the surface of the screen, receiving a portion of the image displayed on the surface of the screen at one end, and outputting the received image to another end which is different in dimension from the screen surface, comprising:
    a step of a sensing process for acquiring a position and orientation of the optical device over the screen,
    a step of an image synthesis process for generating an image of a character, adding the image of the character to a background image at a position and with an orientation in response to the position and orientation of the optical device, and
    a step of a process for displaying the synthesized image on the screen.

* * * * *